UNITED STATES PATENT OFFICE.

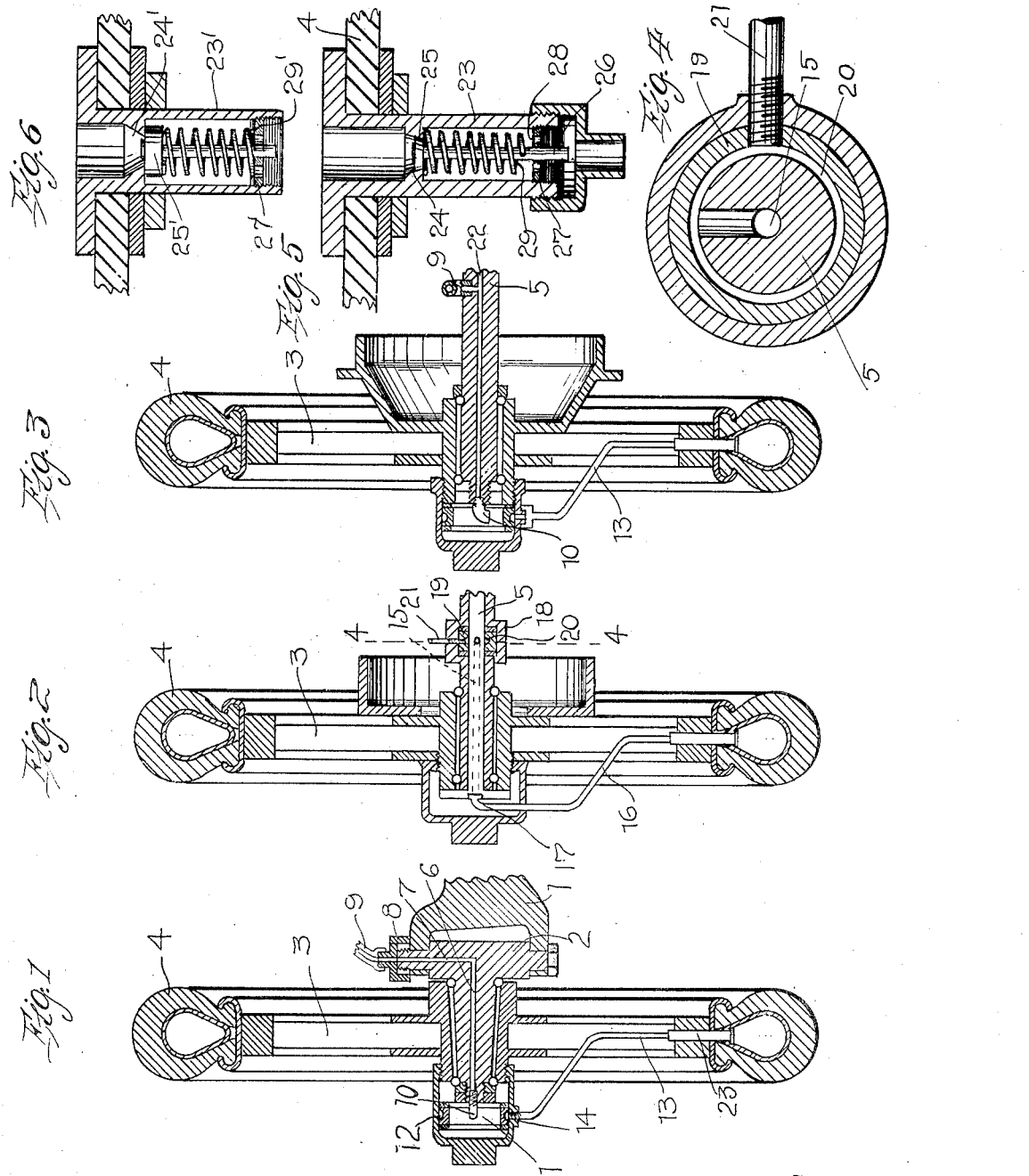

CHARLES P. McDOWELL, OF WINLOCK, AND RICHARD H. EASTER, OF ELMA, WASHINGTON.

SYSTEM FOR INFLATING PNEUMATIC TIRES.

1,083,847.

Specification of Letters Patent.

Patented Jan. 6, 1914.

Original application filed September 19, 1912, Serial No. 721,292. Divided and this application filed February 3, 1913. Serial No. 745,956.

*To all whom it may concern:*

Be it known that we, CHARLES P. McDOWELL and RICHARD H. EASTER, citizens of the United States, residing at Winlock and Elma, respectively, in the counties of Lewis and Chehalis, respectively, and State of Washington, have invented certain new and useful Improvements in Systems for Inflating Pneumatic Tires, of which the following is a specification, reference being had to the accompanying drawings.

This invention relates to improvements in systems for inflating pneumatic tires, and more particularly to that class of systems as disclosed in our prior application filed September 19, 1912, Serial No. 721,292, of which this is a divisional application.

The primary object of this invention is the provision of means for connecting the pneumatic tires of an automobile or similar vehicle with the suitable source of supply such as a pump, which is mounted in the frame of the vehicle.

A further object of this invention is the provision of means whereby air may be introduced into the tires while the vehicle is in motion.

With these and other objects in view, our invention consists in certain novel constructions, combinations, and arrangements of parts to be hereinafter more fully described, claimed, and illustrated in the accompanying drawing, in which.

Figure 1 is a vertical section through the front steering wheel and axle of an automobile illustrating the connection therebetween; Fig. 2 is a similar section through the rear axle and drive wheel illustrating the connection therebetween when the wheels are connected directly to the rear drive shaft; Fig. 3 is a similar view illustrating a modification between the rear drive wheel and the axle to the rear wheels being provided with chain drive mechanism; Fig. 4 is a section on the line 4—4 of Fig. 2; Fig. 5 is a detail sectional view of the inlet valve connection between the source of supply and the pneumatic tire of a wheel; and Fig. 6 is a detail sectional view of the outlet valve connection between the source of supply and the pneumatic tire of a wheel.

Referring more particularly to the accompanying drawing, in which corresponding parts are designated by like numerals throughout the several views, the numeral 1 designates a front axle of an ordinary motor vehicle, to which the usual stub axle 2 is pivotally connected, on which is mounted the usual front steering wheel 3 and pneumatic tire 4. The numeral 5 designates the rear axle of the vehicle, to which is keyed the usual drive wheel 3 and the tire 4. The stub axle 2 has formed therein a horizontally extending channel or passage way 6, the inner end of the channel extending upwardly at right angles as at 7, and connected to the vertical portion of the channel by a swivel joint 8 of any suitable construction is one end of a flexible tube 9 which is connected at its opposite end to a suitable source of supply, (not shown). From this construction it is obvious that said axle may be oscillated in the usual manner in steering the vehicle, but at the same time allowing direct communication between the tube 9 and the channel 7. It is apparent that the stub axle is held stationary and the wheel 3 is allowed to rotate freely thereupon in the usual manner, and extending through the outer extremity of the stub axle in communication with the channel 6, is a metal tube 10 which is connected at its opposite end to a ring 11. This ring 11 is provided upon its outer periphery with a centrally arranged circumferential groove 12, which communicates with the tube 10 extending from the stub axle. Carried by the wheel 3 is a tube 13 which is in communication at one end with the pneumatic tire of the wheel, and its opposite end is mounted within an opening 14 formed in the hub cap of the wheel. This opening 14 is in communication with the groove 12 formed within the ring 11 so that a current of air may be in constant communication with the source of supply of the pneumatic tire, while the wheel is freely rotating upon the stub axle.

The rear axle 5 is provided with a passage way 15 in each end thereof, and a tube 16 is connected at one end by a swivel joint 17 in the outer end of the passage way 15 and at its opposite end to the tire of the rear wheel. An enlarged boxing 18 is formed with the rear axle and slidably mounted therein is a ring 19 the inner periphery of which is provided with a circumferentially extending groove 20, which is in direct communication with the passage way 15. One end of a tube 21 extends through the rear axle casing and is permanently connected to the ring 19 in direct communication with the groove 20 formed therein, whereby communication may be had between the source of supply and the tire 4 through the medium of the tube 21 through 20, passage way 15 and the tube 16. It will be further noted that the tube 21 provides means for holding the ring in a stationary position during the rotation of the drive shaft.

In the modified form of the device illustrated in Fig. 3 of the drawing, is shown a drive wheel 3 of the vehicle adapted to be driven by means of a sprocket chain, and we provide means within the hub of the wheel the same as that of the hub of the front or steering wheel illustrated in Fig. 1 of the drawing, but the rear axle 5 is provided with one passage or channel 22 leading to each drive wheel, and being in direct communication with the tube 10 and the tube 9 leading to the source of supply. With this construction it will be seen that when one of the tires is punctured or collapsed, the other tire on the same axle will be simultaneously collapsed to prevent swerving of the vehicle which often occurs when one tire of an axle is punctured while the machine is traveling at a high rate of speed.

In Fig. 5 of the drawing, we have illustrated an inlet valve connection between the system and the pneumatic tire of the vehicle, the connection comprising a tube 23 which extends through each of the tires 4 of the vehicle and is in communication with the tubes 13 and 16. The inner end of the tube 23 is provided with a valve seat 24 in which is adapted to rest the usual conical valve 25. Extending from this valve 25 is a valve stem 26 which is slidably mounted within the bearing disk 27. This disk is threadably disposed within the tube 23 and is provided with a plurality of apertures 28 through which the air may pass from the tube 13 into the tire. The bearing disk 27 is adjustably mounted within a tube by reason of its threaded connection therewith, whereby the tension of the coil spring 29 which is disposed around the stem 26 between the valve 25 and the disk may be increased to regulate the pressure which is necessary to open the valve 25.

In Fig. 6 of the drawing we have illustrated a discharge valve connection which is to be arranged within the pneumatic tires and diametrically opposite from the inner valves secured within the tires, hereinbefore described. This valve provides means whereby air may be allowed to escape from the tires when too great a pressure is introduced within the tires thereby preventing bursting thereof. This valve comprises a tube 23' having formed therein, an outwardly facing valve seat 24' upon which is adapted to rest a valve 25'. It will be seen from the drawing, that the tension of the spring 29' may be regulated by reason of the threaded connection of the disk 27' with the tube 23', so that air may be allowed to escape from the tire through the tube 23' when a predetermined pressure of the air within the tire has been maintained.

From the foregoing it will be seen that we have provided means for connecting the pneumatic tires of a vehicle with a suitable source of supply, which means comprise a minimum number of parts so that the device may be cheaply manufactured.

It is to be understood that minor changes in construction may be made without departing from the spirit of our invention or sacrificing any of its advantages as determined by the scope of the appended claims.

What is claimed is:—

1. A vehicle having a channeled axle and a pneumatic-tired wheel, said wheel being provided with a hub cap, a ring having an annular groove in its outer periphery arranged within said hub cap, the outer periphery of said ring engaging the inner periphery of said hub cap thereby closing said annular groove, a pipe connected at one end with said channel, the opposite end of said pipe extending through said ring into communication with the annular groove therein, a pipe disposed through said hub cap into communication with the annular groove in said ring, the opposite end of the second mentioned pipe communicating with the tire, and means for connecting said channeled axle with a suitable source of air supply, as and for the purpose described.

2. A vehicle having a channeled axle and a pneumatic-tired wheel, said wheel being provided with a hub cap, a ring having an annular groove in its outer periphery arranged within said hub cap, a pipe having one end disposed in said channel, the opposite end of said pipe extending through said ring into communication with the groove therein, means for connecting said groove with the wheel tire, and means for connecting said channel with a suitable source of air supply, as and for the purpose described.

In testimony whereof we hereunto affix our signatures in the presence of two witnesses.

CHAS. P. McDOWELL.
RICHARD H. EASTER.

Witnesses:
C. S. AVEY,
F. M. COOMBS.